(12) United States Patent
Zhong et al.

(10) Patent No.: US 7,899,334 B2
(45) Date of Patent: Mar. 1, 2011

(54) SIGNAL DISTRIBUTION MODULE FOR A DIRECTIONLESS RECONFIGURABLE OPTICAL ADD/DROP MULTIPLEXER

(75) Inventors: Shan Zhong, Ellicott City, MD (US); Jun Bao, Ellicott City, MD (US)

(73) Assignee: Ciena Corporation, Linthicum, MD (US)

( * ) Notice: Subject to any disclaimer, the term of this patent is extended or adjusted under 35 U.S.C. 154(b) by 295 days.

(21) Appl. No.: 12/268,817

(22) Filed: Nov. 11, 2008

(65) Prior Publication Data

US 2009/0067845 A1    Mar. 12, 2009

Related U.S. Application Data

(60) Continuation-in-part of application No. 12/234,049, filed on Sep. 19, 2008, now Pat. No. 7,697,843, which is a division of application No. 11/855,427, filed on Sep. 14, 2007, now Pat. No. 7,499,652, which is a division of application No. 10/768,057, filed on Feb. 2, 2004, now Pat. No. 7,308,197.

(60) Provisional application No. 60/444,284, filed on Jan. 31, 2003, provisional application No. 60/443,898, filed on Jan. 31, 2003.

(51) Int. Cl.
*H04J 14/00* (2006.01)

(52) U.S. Cl. ............... 398/157; 398/45; 398/83
(58) Field of Classification Search ............ 398/83–85, 398/42–57, 157
See application file for complete search history.

(56) References Cited

U.S. PATENT DOCUMENTS

| | | | |
|---|---|---|---|
| 6,122,096 A | 9/2000 | Fatehi | 359/337.21 |
| 6,348,984 B1 | 2/2002 | Mizrahi | 398/79 |
| 6,426,833 B1 * | 7/2002 | Bao | 359/341.32 |
| 6,657,774 B1 * | 12/2003 | Evans et al. | 359/334 |
| 2002/0186432 A1 | 12/2002 | Roorda et al. | 359/128 |

* cited by examiner

*Primary Examiner*—Leslie Pascal
(74) *Attorney, Agent, or Firm*—Clements Bernard PLLC; Christopher L. Bernard; Tyler S. Brown

(57) ABSTRACT

The present invention provides a signal distribution module for use in a directionless reconfigurable optical add/drop multiplexer application, including: a multi-cast switch having a plurality of input ports and a plurality of output ports; a plurality of optical amplifiers coupled to the plurality of input ports of the multi-cast switch, wherein the plurality of optical amplifiers form an optical amplifier array; a tunable optical splitter coupled to the plurality of optical amplifiers; and a pump laser coupled to the tunable optical splitter.

19 Claims, 11 Drawing Sheets

SIGNAL DISTRIBUTION MODULE FOR A DIRECTIONLESS RECONFIGURABLE OPTICAL ADD/DROP MULTIPLEXER

CROSS-REFERENCE TO RELATED APPLICATION(S)

The present non-provisional patent application is a continuation-in-part of U.S. patent application Ser. No. 12/234, 049, filed on Sep. 19, 2008 now U.S. Pat. No. 7,697,843, and entitled "MODULAR ADD/DROP MULTIPLEXER INCLUDING A WAVELENGTH SELECTIVE SWITCH," which is a divisional of U.S. patent application Ser. No. 11/855,427, filed on Sep. 14, 2007 now U.S. Pat. No. 7,499, 652, and entitled "MODULAR ADD/DROP MULTIPLEXER INCLUDING A WAVELENGTH SELECTIVE SWITCH," which is a divisional of U.S. patent application No. Ser. 10/768,057, filed Feb. 2, 2004, now U.S. Pat. No. 7,308,197, issued on Dec. 11, 2007, and entitled "MODULAR ADD/DROP MULTIPLEXER INCLUDING A WAVELENGTH SELECTIVE SWITCH," which claims the benefit of priority of U.S. Provisional Patent Application Nos. 60/444,284 and 60/443,898, both filed on Jan. 31, 2003, the contents of all of which are incorporated in full by reference herein.

FIELD OF THE INVENTION

The present invention relates generally to optical communication systems. More specifically, the present invention relates to a signal distribution module for a directionless reconfigurable optical add/drop multiplexer (ROADM).

BACKGROUND OF THE INVENTION

In optical communication systems, optical signals are transmitted along an optical communication path, such as an optical fiber. Early optical communication systems deployed a single optical transmitter at a nominal wavelength of light at one end of an optical fiber link and a single optical receiver at the other end of the optical fiber link to detect the incoming optical signals. More recently, wavelength division multiplexed (WDM) systems have been deployed in which multiple wavelengths of light are combined onto a single optical fiber in order to increase the information carrying capacity of the optical communication network.

In a WDM system, multiple optical transmitters feed optical signals to an optical multiplexer that is provided at one end of an optical fiber link and an optical demultiplexer is provided at the other end of the optical fiber link to separate the combined optical signal into its constituent optical signals at corresponding wavelengths of light. Often, however, optical communication network configurations require that given wavelengths of light be selected or "dropped" from the combined optical signal prior to reaching the optical demultiplexer at the termination point of the optical fiber link. In addition, optical signals at the "drop" wavelength of light or other wavelengths of light are often required to be added prior to the termination point of the optical fiber link. Accordingly, optical add/drop multiplexers have been developed that add/drop optical signals at given wavelengths of light, while permitting optical signals at other wavelengths of light to pass to the add/drop or termination points.

A conventional optical add/drop multiplexer is described, for example, in U.S. Pat. No. 6,459,516, the contents of which are incorporated in full by reference herein. This optical add/drop multiplexer flexibly accommodates a relatively large number of added/dropped optical signals or channels. The channels that are added/dropped are fixed, however, and the optical add/drop multiplexer is not remotely reconfigurable.

An alternative optical add/drop multiplexer is a select optical add/drop multiplexer (SOADM), commercially available from CIENA Corporation of Linthicum, Md. As illustrated in FIG. 1, the SOADM receives incoming optical signals through an optical amplifier 110. The optical signals are passed from the optical amplifier 110 to a power splitter or coupler 120, which supplies a first portion of each incoming optical signal to a reconfigurable blocking filter (RBF) 130 and a second portion of each incoming optical signal to a pre-booster amplifier 160 and, subsequently, a router 180. The router 180 separates the second portion of each incoming optical signal into separate channel groups, one of which is passed through a segment of dispersion compensating fiber (DCF) 121, and then to an optical amplifier USA 197. The channel group is then fed to a channel group demultiplexer including a 1×8 splitter 119, which supplies the channel group on each of eight outputs. The splitter 119 is a conventional power splitter, such that the signal strength of each output is attenuated to about $\frac{1}{8}^{th}$ the power of the input. Channel filters (not illustrated) are coupled to each output of the splitter 119 to select individual channels from each output and supply the demultiplexed channels to corresponding receivers (not illustrated).

Added channels are supplied from transmitters (not illustrated) to an 8×1 combiner 117 through an amplifier 115 and a router 195. At the output of the router 195, the added channel group is passed through an optional segment of DCF 190 and amplified by an amplifier 170. The added channel group is the combined with the channels output from the RBF 130 by a coupler 140, and the resulting WDM signal is output through an amplifier 150.

In operation, the RBF 130 is configured to block the channel group selected by a port 161 of the router 180, while the remaining channel groups pass through. Although non-selected wavelengths of are also supplied to the router 180, no optical demultiplexing elements or optical receivers are provided to sense the non-selected wavelengths of light. The added channels are typically at the same wavelength of light as the blocked channels in order to prevent interference between those optical signals passed through the RBF 130 and those optical signals that are added. Alternatively, the added channels may be different from any of the pass through channels.

Moreover, the RBF 130 may be reconfigured such that a different channel group is blocked. In which case, optical demultiplexers must be added to a different port or slot of the router 180, for example. Since the optical add/drop multiplexers are often deployed in remote locations, service personnel must travel to the optical add/drop multiplexer site(s) and physically attach the channel group optical demultiplexer to a new output port of the router 180.

Alternatively, the RBF 130 may be replaced with a wavelength selective switch (WSS) 210, as illustrated in FIG. 2. WSSs are known components that are coupled to multiple input lines and output lines, and selectively block optical signals on a per wavelength basis. In this instance, the WSS 210 is coupled to input lines 209, 213, and 215, and output lines 222, 225, and 226. The operation of the routers and group demultiplexers is similar to that described above with regard to FIG. 1. However, as illustrated in FIG. 2, additional routers may be provided, each one coupled to a corresponding one of the input lines or output lines. However, the WSS-based optical add/drop multiplexer illustrated in FIG. 2 suffers from disadvantages similar to those described above with regard to FIG. 1. Namely, any reconfiguration of the WSS 210 resulting in a change in the wavelengths of light to be added/dropped requires physically coupling the channel group optical demultiplexers to a different router output port.

ROADMs are the key technology for the next generation of dense wavelength division multiplexing (DWDM) systems. These ROADMs allow for the automated rearrangement of wavelengths of light on the multichannel optical fibers entering and leaving optical network nodes. For a high-degree optical network node, with a degree number of up to 8, for example, directionless ROADMs are preferred because they may route any wavelength of light on any optical fiber (or from any direction) to any given transceiver entirely in the optical domain.

As is described in greater detail herein below, in existing ROADM designs, erbium-doped fiber amplifier (EDFA) arrays with fixed gains or output powers are utilized in order to satisfy a worst case scenario, even though there are only M (e.g. 8 or 16) channels to be dropped for a given modular design. This is not a cost effective solution. Each EDFA is over designed to support the worst case scenario, when all of the wavelengths of light or channels are fully populated. More than 40% of the associated cost is attributed to the pump lasers for the individual EDFAs. In order to simplify the design of the signal distribution modules utilized in directionless ROADM applications, as well as shrink their size and lower their cost, the present invention provides a novel configuration that takes full advantage of type A/type B+ N×M multi-cast switches and the advanced EDFA array design with planar lightwave circuit (PLC)-based tunable pump splitters.

BRIEF SUMMARY OF THE INVENTION

In one exemplary embodiment, the present invention provides a signal distribution module for use in a directionless reconfigurable optical add/drop multiplexer application, including: a multi-cast switch having a plurality of input ports and a plurality of output ports; a plurality of optical amplifiers coupled to the plurality of input ports of the multi-cast switch, wherein the plurality of optical amplifiers form an optical amplifier array; a tunable optical splitter coupled to the plurality of optical amplifiers; and a pump laser coupled to the tunable optical splitter. The multi-cast switch is an N×M multi-cast switch having N input ports and M output ports. The plurality of optical amplifiers include N optical amplifiers coupled to the N input ports of the N×M multi-cast switch. The plurality of optical amplifiers include a plurality of erbium-doped fiber amplifiers, and wherein the plurality of erbium-doped fiber amplifiers form an erbium-doped fiber amplifier array. The tunable optical splitter is a 1×N tunable optical splitter coupled to the N optical amplifiers. The tunable optical splitter is operable for providing a predetermined portion of a pump laser signal emanating from the pump laser to each of the plurality of optical amplifiers. More specifically, the tunable optical splitter is operable for providing the predetermined portion of the pump laser signal emanating from the pump laser to each of the plurality of optical amplifiers responsive to an insertion loss associated with each of a plurality of corresponding switches of the multi-cast switch. Finally, the tunable optical splitter is operable for providing the predetermined portion of the pump laser signal emanating from the pump laser to each of the plurality of optical amplifiers responsive to the insertion loss associated with each of the plurality of corresponding switches of the multi-cast switch such that a total output power of each of the plurality of output ports of the multi-cast switch is substantially equal.

In another exemplary embodiment, the present invention provides a signal distribution method for use in a directionless reconfigurable optical add/drop multiplexer application, including: providing a multi-cast switch having a plurality of input ports and a plurality of output ports; coupling a plurality of optical amplifiers to the plurality of input ports of the multi-cast switch, wherein the plurality of optical amplifiers form an optical amplifier array; coupling a tunable optical splitter to the plurality of optical amplifiers; and coupling a pump laser to the tunable optical splitter. The multi-cast switch is an N×M multi-cast switch having N input ports and M output ports. The plurality of optical amplifiers include N optical amplifiers coupled to the N input ports of the N×M multi-cast switch. The plurality of optical amplifiers include a plurality of erbium-doped fiber amplifiers, and wherein the plurality of erbium-doped fiber amplifiers form an erbium-doped fiber amplifier array. The tunable optical splitter is a 1×N tunable optical splitter coupled to the N optical amplifiers. The tunable optical splitter is operable for providing a predetermined portion of a pump laser signal emanating from the pump laser to each of the plurality of optical amplifiers. More specifically, the tunable optical splitter is operable for providing the predetermined portion of the pump laser signal emanating from the pump laser to each of the plurality of optical amplifiers responsive to an insertion loss associated with each of a plurality of corresponding switches of the multi-cast switch. Finally, the tunable optical splitter is operable for providing the predetermined portion of the pump laser signal emanating from the pump laser to each of the plurality of optical amplifiers responsive to the insertion loss associated with each of the plurality of corresponding switches of the multi-cast switch such that a total output power of each of the plurality of output ports of the multi-cast switch is substantially equal.

In a further exemplary embodiment, the present invention provides a signal distribution module for use in a directionless reconfigurable optical add/drop multiplexer application, including: a multi-cast switch having a plurality of input ports and a plurality of output ports; a plurality of optical amplifiers coupled to the plurality of input ports of the multi-cast switch, wherein the plurality of optical amplifiers form an optical amplifier array; a tunable optical splitter coupled to the plurality of optical amplifiers; and a pump laser coupled to the tunable optical splitter; wherein the tunable optical splitter is operable for providing a predetermined portion of a pump laser signal emanating from the pump laser to each of the plurality of optical amplifiers such that a total output power of each of the plurality of output ports of the multi-cast switch is substantially equal.

BRIEF DESCRIPTION OF THE DRAWINGS

The present invention is illustrated and described herein with reference to the various drawings, in which like reference number are used to denote like system components/method steps, as appropriate, and in which.

DETAILED DESCRIPTION OF THE INVENTION

Consistent with the optical communication system of the present invention, tunable optical demultiplexers have been provided in WSS-based optical add/drop multiplexers. The tunable optical demultiplexers have been modular, and thus allow the optical add/drop multiplexers to be readily expandable and facilitate flexible optical add/drop capabilities, whereby a channel present on any input line to the WSS may be dropped and supplied to one or more desired output lines of the tunable optical demultiplexers. Similar flexibility has been achieved on the add-side of the WSS. Moreover, the optical demultiplexers and the WSS have been remotely configurable, thus obviating the need to manually disconnect and connect the optical demultiplexers to a router. Multi-cast switches have been provided that permit the same channel, for example, to be provided to one or more output lines of the optical add/drop multiplexer, such that a copy of the channel may carry working traffic, while another copy of the channel may carry protection traffic. As a result, 1+1 and 1:N optical layer protection has been achieved.

Figure 1:
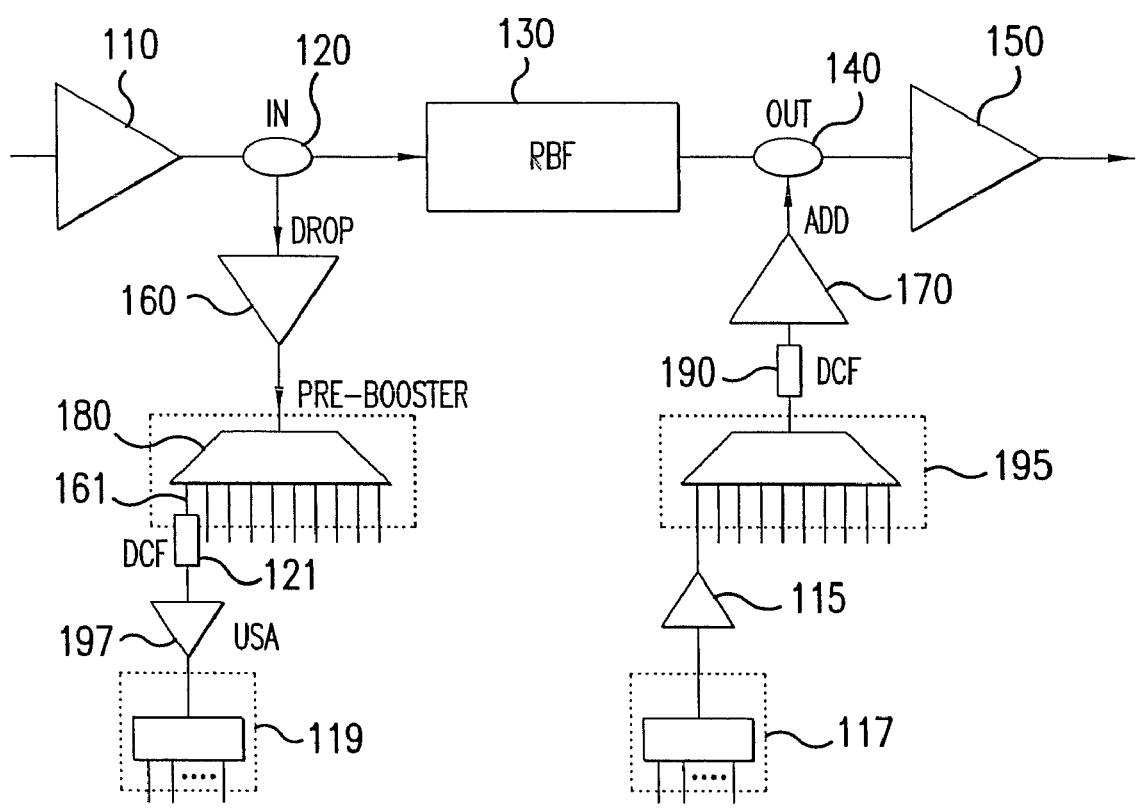
FIG. 1 is a schematic diagram illustrating a conventional optical add/drop multiplexer design incorporating a RBF.
Figure 2:
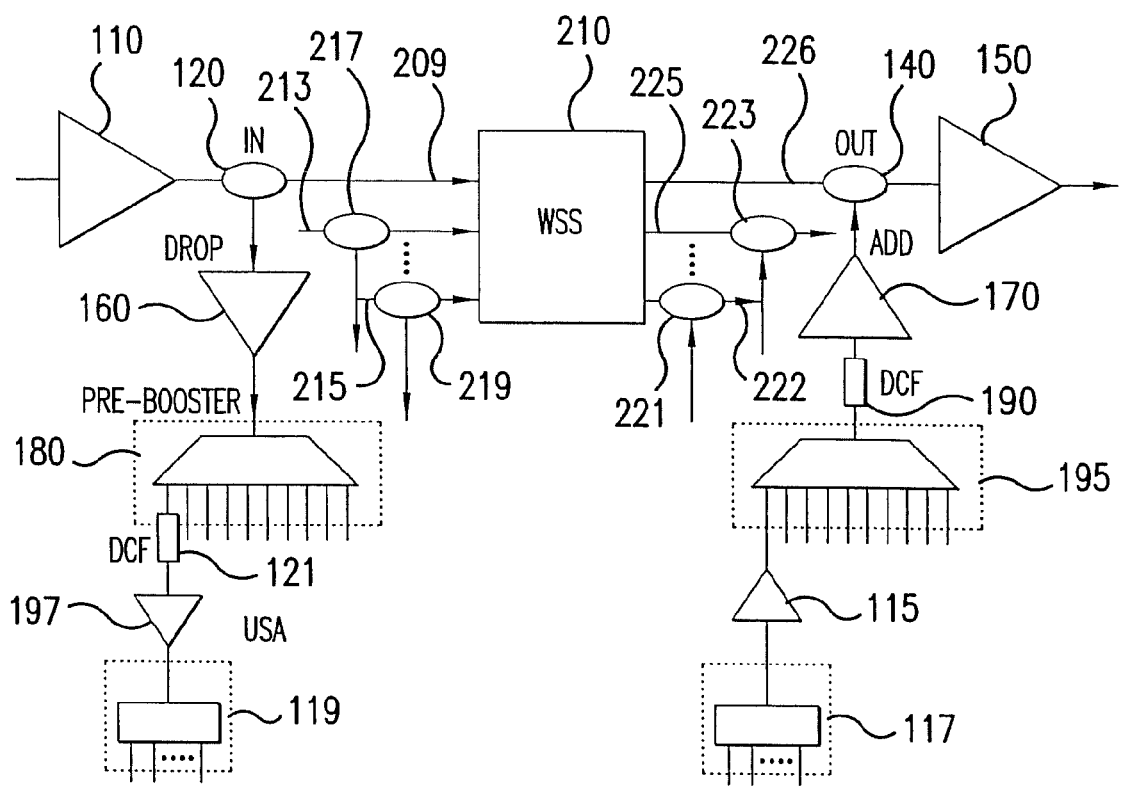
FIG. 2 is a schematic diagram illustrating a conventional optical add/drop multiplexer design incorporating a WSS.
Figure 3:
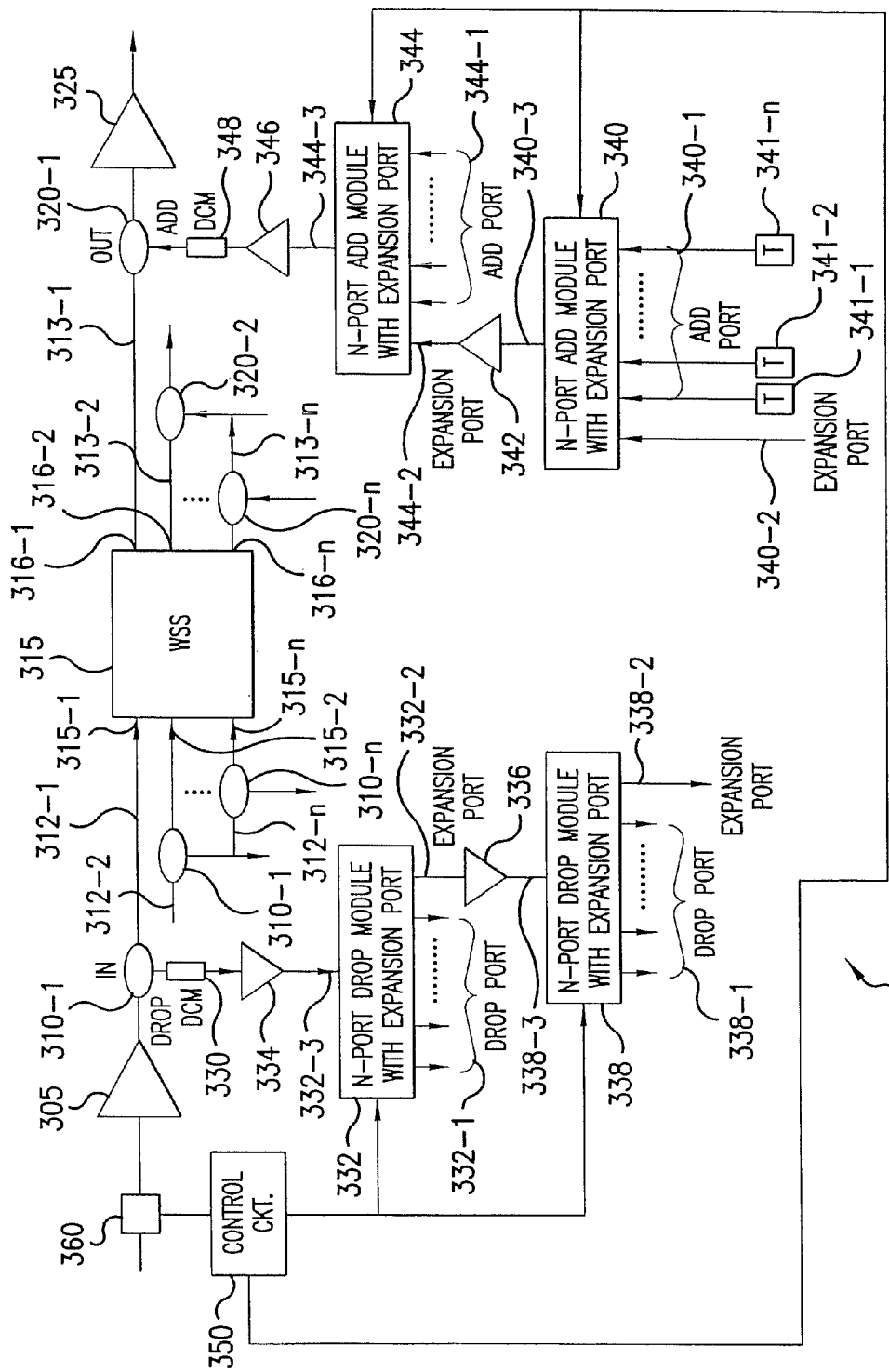
FIG. 3 is a schematic diagram illustrating a WSS-based optical add/drop multiplexer consistent with an aspect of the present invention.

FIG. 3 illustrates a WSS-based optical add/drop multiplexer 302 consistent with an aspect of the present invention. The optical add/drop multiplexer 302 includes a WSS 315 having a plurality of input ports 315-1 to 315-n each coupled to a respective one of a plurality of input optical communication paths 312-1 to 312-n. Each input optical communication path 312-1 to 312-n may be coupled to an optical amplifier, such as the optical amplifier 305 coupled to the first input optical communication path 312-1, for example. The input optical communication paths 312-1 to 312-n each include commercially available optical fiber, for example, and the optical amplifier 305 is a conventional EDFA, for example. Input optical signals, each at a particular wavelength of light, and collectively constituting a WDM signal, propagate along the first input optical communication path 312-1. Other WDM signals likewise propagate along the other input optical communication paths 312-2 to 312-n.

As further illustrated in FIG. 3, a power splitter 310-1, including, for example, a fiber optic coupler, tap, or other suitable optical component, is coupled to the first input optical communication path 312-1. Likewise, power splitters 310-2 to 310-n are coupled to the other respective input optical communication paths 312-2 to 312-n. A first portion of the WDM signal propagating on the first input optical communication path 312-1 is output from the power splitter 310-1, through an optional dispersion compensating module 330 and an optional optical amplifier 334 to an input port 332-3 of a tunable optical demultiplexer 332. Selected channels (i.e. optical signals at specific wavelengths of light) are respectively output from corresponding ones of the outputs 332-1. Other channels, however, are output through an expansion port 332-2, and fed through an optional optical amplifier 336 to an input port 338-3 of a tunable optical demultiplexer 338. These other channels are then separated and supplied to corresponding ones of first outputs 338-1 and to receivers discussed in greater detail herein below, but a second output 338-2 is a supplemental port not connected to any receivers.

Initially deployed WDM optical communication systems are not fully populated with a maximum number of channels, as capacity requirements are typically lower at first but increase over time. Thus, a full complement of optical demultiplexers may not be required at first, but rather a smaller number is sufficient to drop the relatively low numbers of channels typically present when a WDM optical communication system is first deployed. Accordingly, a limited number of tunable optical demultiplexers are often provided at system turn-up, but each has a supplemental port, not connected to receiver circuits, such that additional tunable optical demultiplexers may be attached later on as capacity requirements grow. Large optical demultiplexer circuits need not be installed early in a product life cycle. Instead, modular tunable optical demultiplexers are added incrementally on an as-needed basis, resulting in substantial cost savings.

Returning to FIG. 3, the optical demultiplexer 332 is tunable because the wavelengths of light selected for output at each port may be tuned or adjusted in response to a control signal. For example, an optical signal having wavelength $\lambda_1$ may initially be output from one of the drop ports 332-1 of the flexible optical demultiplexer 332 (i.e. the N-port drop module). In response to a control signal, however, a different optical signal having wavelength $\lambda_9$ may be output.

Control information is carried by an optical service channel present on one of the input optical communication paths 312-1, for example. An additional optical demultiplexer 360, such as an optical filter, selects the optical service channel, which is typically at a wavelength of light that is different than the other information carrying wavelengths of light of the WDM signal. As is generally understood, the optical service channel often carries optical system or optical network-related information, such as diagnostic, monitoring, as well as control information. The optical service channel is output from the optical demultiplexer 360 and supplied to a control circuit 350, which converts the optical service channel into corresponding electrical signals in a known manner, and generates appropriate control signals in response to the received optical service channel. The control signals may be supplied to each of the tunable optical demultiplexers 332 and 338, for example.

Adding channels is similar to dropping them, but in reverse. A plurality of conventional tunable optical transmitters 341-1 to 341-n are coupled to respective ones of the inputs or add ports 340-1 of a combiner or tunable optical multiplexer 340. The optical multiplexer 340 also has a supplemental input or expansion port not coupled to an optical transmitter to accommodate further combiners as system capacity requirements increase. Optical signals generated by the transmitters 341-1 to 341-n are typically each at a different wavelength of light and are supplied to the output 340-3, through an optional optical amplifier 342, and to an input or expansion port 344-2 of the combiner 344. The combiner 344 also receives additional optical signals, each at a respective wavelength of light, on respective ones of the add ports or inputs 344-1 from optical transmitters (not illustrated), similar to the optical transmitters 341-1 to 341-n. The optical signals supplied through the expansion port 344-2 and add ports 344-1 are combined onto the output 344-3 and fed to the combiner 320-1, through an optional optical amplifier 346 and an optional dispersion compensating element 348. The optical combiner 320-1 combines these optical signals with signals output from the WSS 315 through a port 316-1 onto the output optical communication path 313-1, through an optional optical amplifier 325. The optical amplifier 325, as well as other optical amplifiers described herein, are provided to offset any attenuation of the optical signals passing through the WSS 315, as well as those added and dropped by the optical add/drop multiplexer 302.

Moreover, additional combiners, similar to the combiners 340 and 344, may be coupled in a similar manner to the combiners 320-2 to 320-n to facilitate the coupling or combining of the optical signals output from the WSS output ports 316-2 to 316-n onto further output optical communication paths 313-2 to 313-n. The tunable optical multiplexers or combiners 340 and 344 may have a structure similar to the tunable optical; demultiplexers 332 and 338, but are connected in reverse, such that the add ports input signals instead of outputting them, and the outputs of the combiners 340 and 344 supply signals instead of receiving them.

Although the tunable optical demultiplexers are illustrated for combining optical signals in the various embodiments of the present invention, other combiners may also be utilized. For example, conventional passive optical combiners, or other suitable optical components, that combine optical signals may be used in conjunction with the systems and methods of the present invention. It should be noted that passive optical combiners typically cost less than tunable optical demultiplexers.

Figure 4C:
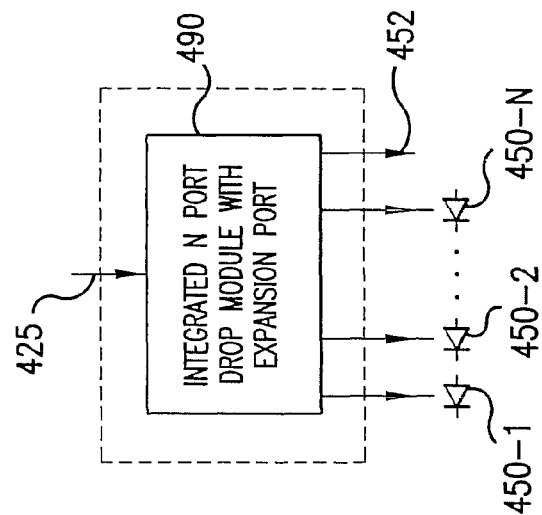
FIGS. 4(a)-4(c) are schematic diagrams illustrating examples of tunable optical demultiplexers consistent with an aspect of the present invention.
Figure 4B:
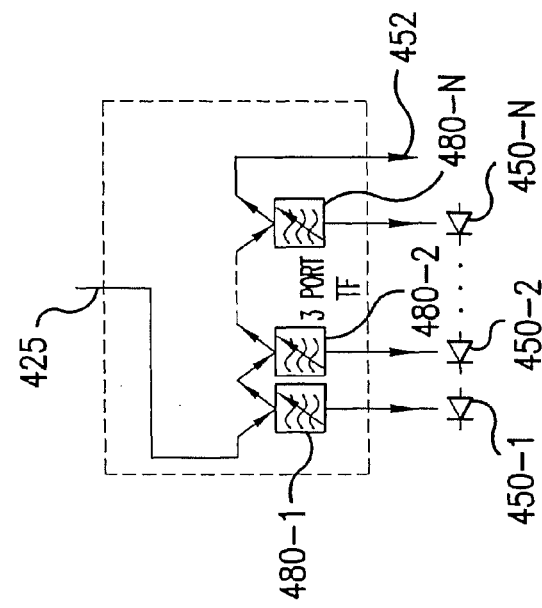
Figure 4A:
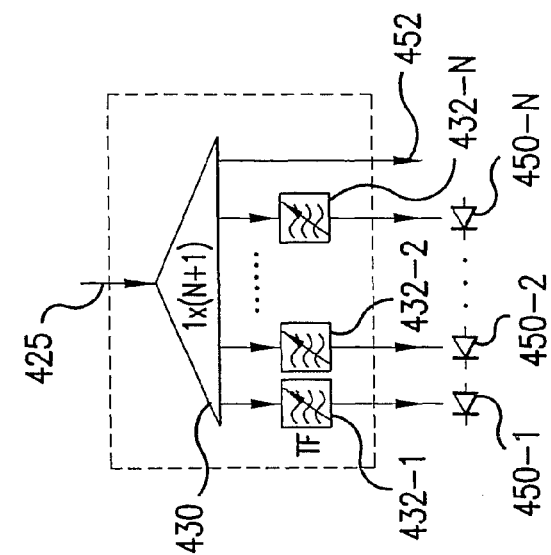

FIGS. 4(a)-4(c) illustrate examples of tunable optical demultiplexers consistent with an aspect of the present invention. It should be understood that any of the tunable optical demultiplexers may have a construction as illustrated in one or more of FIGS. 4(a)-4(c). In the example illustrated in FIG. 4(a), the tunable optical demultiplexer includes a 1×N+1 splitter 430 having an input 425 (e.g. corresponding to an input 332-1) that receives signals supplied from the splitter 310-1 (FIG. 3), for example. The splitter 430 has N+1 outputs, N of which supply attenuated portions of the input optical signal to corresponding tunable filters 432-1 to 432-n, each of which is controlled in accordance with information contained in, or in response to, the optical service channel to select an optical signal at a desired wavelength of light. The filtered optical signals are then supplied to corresponding receivers 450-1 to 450-n. The N+1th output, however, corresponds to the supplemental or expansion output to facilitate modular expansion of the optical demultiplexing capabilities of the optical add/drop multiplexer in an inexpensive manner.

Referring to FIG. 4(b), the tunable filters 480-1 to 480-n are cascaded, whereby the optical signals fed through the input 425 are first supplied to the tunable filter 480-1, which reflects, for example, one of the input signals, but passes the remaining signals. The remaining signals are then input to the tunable filter 480-2, which selects another optical signal in a similar fashion as the tunable filter 480-1. The remaining signals are passed from one tunable filter to the next, and, at each filter, a different channel is selected. The selected channels are, in turn, fed to corresponding receivers 450-1 to 450-n. If any channels are not selected by the tunable filters 480-1 to 480-n, they are fed to a supplemental output 452 for propagation to another tunable optical demultiplexer, as noted above. The tunable filters 480-1 to 480-n are controlled in response to the optical service channel.

As illustrated in FIG. 4, an integrated N-port drop module including tunable filters configured as illustrated in either FIG. 4(a) or FIG. 4(b) may also be provided. In which cases, the tunable filters and other necessary components are integrated into a single component housing 490. As in other examples, a supplemental port 452 is also included.

The tunable filters illustrated above are commercially available from JDS Uniphase, Optoplex, or Dicon, for example. The integrated N-port drop module illustrated in FIG. 4(c) is also commercially available from JDS Uniphase, for example.

As noted previously, the exemplary embodiment illustrated in FIG. 3 provides a cost effective, yet flexible, approach to expanding a WSS-based optical add/drop multiplexer. An alternative exemplary embodiment will next be described with reference to FIG. 5 illustrating an optical add/drop multiplexer 510 consistent with a further aspect of the present invention.

Figure 5:
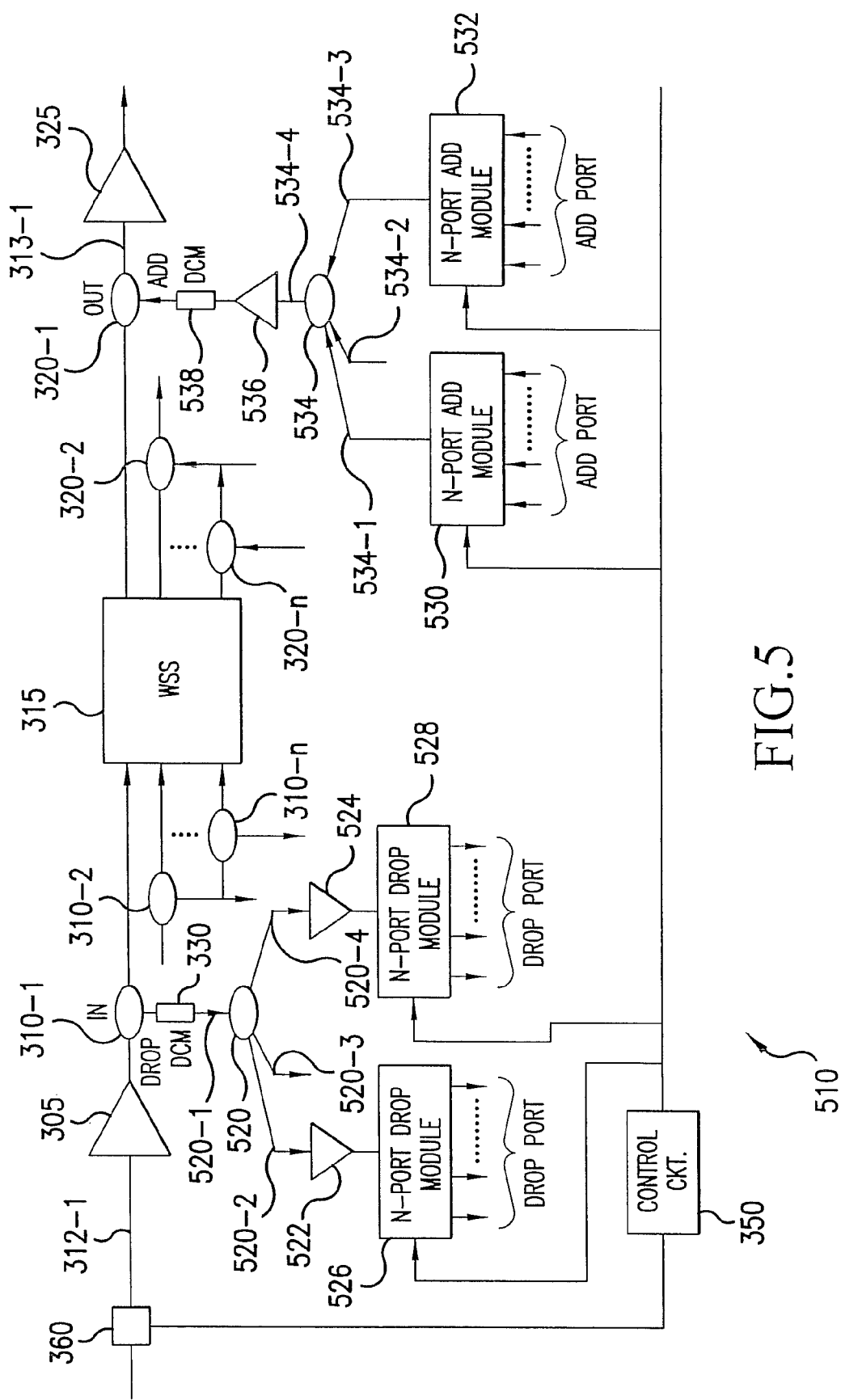
FIG. 5 is a schematic diagram illustrating a WSS-based optical add/drop multiplexer consistent with a further aspect of the present invention.

As with the optical add/drop multiplexer 302 illustrated in FIG. 3, the exemplary embodiment illustrated in FIG. 5 also includes a WSS 315, as well as a plurality of input and output optical communication paths and splitters 310-1 to 310-n. In addition, the optical add/drop multiplexer 510 illustrated in FIG. 5 similarly includes combiners 320-1 to 320-n and output optical communication paths, as discussed above in regard to FIG. 3. The operation of these elements is as before.

The optical add/drop multiplexer 510, however, differs from the optical add/drop multiplexer 302 described previously in that the tunable optical demultiplexers and multiplexers with supplemental or expansion ports are replaced with an additional splitter 520 and combiner 534, for example. Tunable demultiplexers 526 and 528 are also typically included. Although each of the tunable elements 526, 528, 530 and 532 are illustrated without supplemental ports, such supplemental ports may be provided, if necessary, and further tunable optical demultiplexers and multiplexers may attached in a manner similar to that described above in regard to FIG. 3.

The operation of optical add/drop multiplexer 510 will next be described. Optical signals input from the splitter 310-1 and dispersion compensation element 330, for example, are supplied to an optical splitter 520, typically a power splitter, through an input 520-1 which, in turn, supplies portions of the received optical signals to each of the outputs 520-2 to 520-4. The outputs 520-2 and 520-4 are respectively coupled, through optical amplifiers 522 and 524, to tunable optical demultiplexers 526 and 528, which separate the optical signals input thereto in response to the optical service channel carried on an input optical communication path, for example, in a manner similar to that described above with respect to FIGS. 3 and 4(a)-4(c). As a result, desired dropped channels are output from the drop ports illustrated in FIG. 5. It should be understood that additional splitters are coupled to the splitters 310-2 to 310-n, and additional tunable optical demultiplexers are coupled to these additional splitters in a manner similar to that discussed above in regard to the splitter 520 and tunable optical demultiplexers 526 and 528.

The optical splitter 520 also has a supplemental port or output 520-3 not coupled to a tunable optical demultiplexer. The supplemental output 520-3 may accommodate an additional tunable optical demultiplexer, should one be needed in light of increased capacity needs requiring that additional channels be dropped. Upon initial deployment, however, when an optical communication system is not fully populated with WDM signals, as noted above, the supplemental output 520-3 of the splitter 520, for example, allows for modular expansion and a cost-effective upgrade path.

As further illustrated in FIG. 5, added channels are supplied to the tunable optical multiplexers or combiners 530 and 532 in a manner similar to that described above with respect to the tunable optical multiplexers 340 and 344. In response to the optical service channel, the tunable optical multiplexers 530 and 532 combine signals supplied thereto typically onto a single output, which is coupled to corresponding inputs 534-1 and 534-3 or the combiner 534. The signals output from the tunable optical multiplexers 530 and 532 are then further combined onto an output 534-4 of the combiner 534. These signals are then optionally amplified by an amplifier 536, passed though optional dispersion compensating element 538, and fed to an output optical communication path by a combiner 320-1.

The combiner 534 has a supplemental input not coupled to a tunable optical multiplexer, for expansion purposes and accommodating modular growth.

Further combiners, similar to the combiner 534, are also coupled to corresponding ones of the combiners 320-2 to 320-n. Also, an additional tunable optical multiplexer may be coupled to such further combiners in a similar fashion as that described above in regard to the tunable optical multiplexers 530 and 532.

The optical add/drop multiplexers discussed above are advantageous in that each may provide a cost-effective growth path for system operators and users. Moreover, these optical add/drop multiplexers provide substantial flexibility by permitting the dropping of any channel present on a particular input optical communication path. Further, any channel may be added to a particular output optical communication path. Nevertheless, the above-described exemplary embodiments are limited in that each tunable optical demultiplexer and multiplexer is dedicated either to a particular input or output optical communication path. Greater system flexibility may be achieved when the tunable optical demultiplexers and multiplexers may be coupled to any input or output optical communication path of the WSS, as discussed in greater detail below with respect to FIG. 6.

Figure 6:
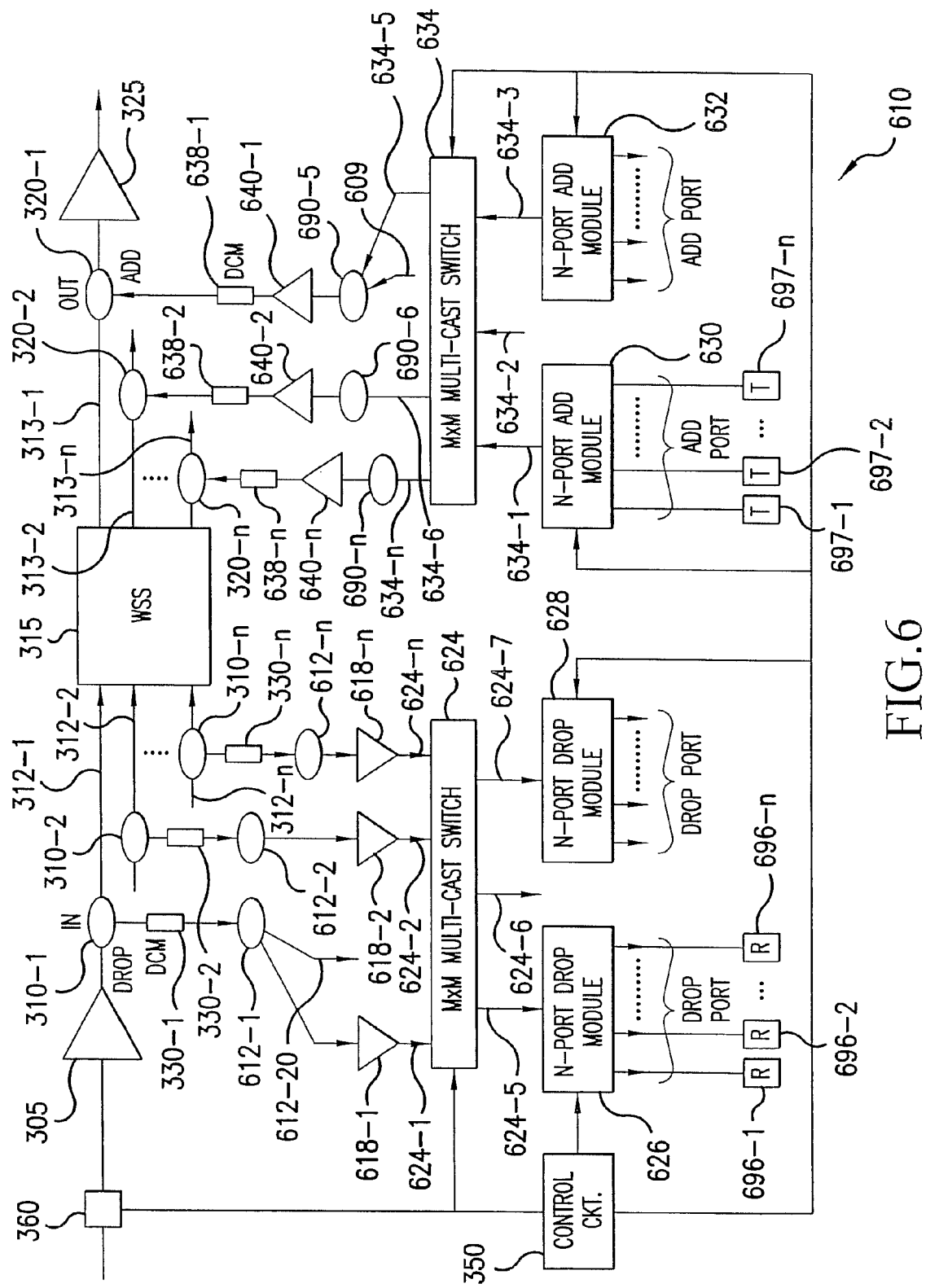
FIG. 6 is a schematic diagram illustrating a WSS-based optical add/drop multiplexer including a multi-cast switch consistent with a further aspect of the present invention.

The optical add/drop multiplexer 610 illustrated in FIG. 6 is similar to the optical add/drop multiplexer 510 illustrated in FIG. 5. Instead of providing splitters, such as the splitter 520, however, being coupled to a bank of optical amplifiers and tunable optical demultiplexers, a plurality of splitters 612-1 to 612-n are provided, each of which is coupled to a corresponding one of the splitters 310-1 to 310-n. Each of the splitters 612-1 to 612-n typically has an output coupled, through a respective one of the amplifiers 618-1 to 618-n, to a multi-cast optical switch 624 (such as an 8×8 multi-cast optical switch commercially available from Lynx PhotoniNEL or Enablence, for example). On the add side, a multi-cast optical switch 634 is provided for coupling tunable optical multiplexers to desired output optical communication paths.

In operation, a portion of the WDM signal present on input optical communication path 312 is passed through an optional dispersion compensating element 330-1 and supplied to a splitter 612-1. The splitter 612-1 typically includes a plurality of outputs, one of which supplies a further portion of the optical signals to the multi-cast switch input 624-1 via an amplifier 618-1. The multi-cast optical switch 624 (illustrated as an M×M optical switch, where M is an integer, e.g. 8) acts to further power split the signal input thereto, but supplies the split signals to selected outputs, instead of all of its outputs (as in the case of a conventional 1×N splitter.) Thus, for example, signals appearing on the input 624-1 may be supplied to the output 624-5 and other selected outputs, but not every output. In which case, since the output 624-5 is coupled to the tunable optical demultiplexer 626, optical signals originating on the input optical communication path 312-1 are only supplied to the tunable optical demultiplexer 626, as well as other selected tunable optical demultiplexers, for example, the tunable demultiplexer 628 through the output 624-7. If desired, all tunable optical demultiplexers are coupled to the multi-cast optical switch 624. Receiver circuits 696-1 to 696-n may be coupled to the respective ports or outputs of the tunable optical demultiplexer 626. Similar receiver circuits are coupled to the drop ports or outputs of tunable optical demultiplexer 628, as well as any other tunable optical demultiplexer coupled to the multi-cast switch 624.

As further illustrated in FIG. 6, other input optical communication paths 312-2 to 312-n are respectively coupled to the multi-cast switch inputs 624-2 to 624-n via corresponding ones of the splitters 312-2 to 312-n, optional dispersion compensating elements 330-2 to 330-n, and optional amplifiers 618-2 to 618-n. Accordingly, the multi-cast switch 624 may serve to couple any input optical communication path to any tunable optical demultiplexer.

The multi-cast optical switches and tunable optical demultiplexers and multiplexers illustrated in FIG. 6 are controlled in response to an optical service channel present on the input optical communication path 312-1, for example. As noted above, the demultiplexer 360 selects the optical service channel from the input optical communication path 360 and supplies the optical service channel to the control circuit 350. The optical service channel is converted to electrical signals by the control circuit 350 and control signals are generated that are used to control the tunable elements 624, 626, 628, 630, 632, and 634, for example.

As further illustrated in FIG. 6, the multi-cast optical switch 634 may be used to couple any add port to any WSS output optical communication path. For example, optical signals supplied to the add ports from the tunable transmitters 697-1 to 697-n (it should be understood that similar transmitters are coupled to the add ports of the tunable optical multiplexer 632, as well as any other tunable optical multiplexer coupled to the multi-cast optical switch 634) or inputs of the tunable optical multiplexer or combiner 630 are combined and supplied to the input 634-1 of the multi-cast optical switch 634. If desired, the multi-cast optical switch 634 may direct those optical signals to a particular output, e.g. the output 634-6. From there, the optical signals pass through the splitter 690-6, optional optical amplifier 640-2, and dispersion compensating element 638-2. The optical signals are next combined with the output signals from the WSS 315 onto the output optical communication path 313-2 by the combiner 320-2. Alternatively, these optical signals could be supplied to other output optical communication paths through one or more other outputs 634-5 to 634-n of the multi-cast optical switch 634, and corresponding ones of the splitters 690-5 to 690-n, optional optical amplifiers 640-1 to 640-n, dispersion compensating elements 638-1 to 638-n, and combiners 320-1 to 320-n. In a similar fashion, the multi-cast optical switch 634 may couple other tunable optical multiplexers or combiners, such as the tunable optical multiplexer 632, to any one of the output optical communication paths 313-1 to 313-n, or be combined with the output from the tunable optical multiplexer 630 and supplied to any desired output optical communication path.

In accordance with a further aspect of the present invention, the splitter 612-1 may be provided with a supplemental output or expansion port 612-20 not connected to the multi-cast switch 624, but for coupling to an additional multi-cast optical switch, if necessary. Moreover, the multi-cast optical switches 624 and 634 may also include a supplemental output 624-6 and supplemental input 634-2, respectively, also for expansion purposes. Further, the combiner 690-5 includes a supplemental input 604 not coupled to the multi-cast switch 634, but included for coupling to additional multi-cast optical switches, as dictated by system and capacity requirements.

The optical add/drop multiplexer illustrated in FIG. 6 advantageously may provide 1+1 protection. For example, the input optical communication path 312-1 may serve as a working path, while input the input optical communication path 312-2 may serve as a protection path. During normal operation, information carried by the working path 312-1 may be directed by the multi-cast switch 624 toward the receiver circuit 696-1. In response to a fault on the working path 312-1, the multi-cast switch 624 (which can also constitute an L×M switch, where L and M do not necessarily have the same value) may route signals originating from the input optical path 312-2, the protection path, to the output 624-5 and to the tunable demultiplexer 626, which itself may be controlled to select the desired optical signals. Such rerouting may be achieved in less than 2 msec, thereby effectively realizing a 1+1 protection scheme.

Protection schemes may also be realized on the add side. For example, the optical signals originating from the tunable optical transmitter 697-1 may be directed toward a working output optical communication path 313-1 by the multi-cast switch 634 through the output 634-5 to the combiner 690-5, optional dispersion compensating element 638-1, optional optical amplifier 640-1, and combiner 320-1. In response to a fault on the optical communication path 313-1, optical signals from transmitter 697-1 may be rerouted by the multi-cast optical witch 634 to be supplied through the output 634-6 to the output optical communication path (a protection path) via the combiner 690-6, optional amplifier 640-2, optional dispersion compensating element 638-2, and combiner 320-2. By facilitating the use of both working and protection paths, 1+1 and 1:N protection schemes may be achieved.

Again, ROADMs are the key technology for the next generation of DWDM systems. These ROADMs allow for the automated rearrangement of wavelengths of light on the multichannel optical fibers entering and leaving optical network nodes. For a high-degree optical network node, with a degree number of up to 8, for example, directionless ROADMs are preferred because they may route any wavelength of light on any optical fiber (or from any direction) to any given transceiver entirely in the optical domain.

Several architectures have been proposed for directionless ROADMs, including the incorporation of a power splitter followed by a receiver with a tunable selector, which is one of the more promising designs that supports full-flexibility directionless add/drop in a modular approach. This architecture is described in U.S. Pat. No. 7,308,197, the contents of which are incorporated in full by reference herein—which is based on N×M multi-cast switches 710 and 720, as is illustrated in FIGS. 7(a) and 7(b).

Figure 7A:
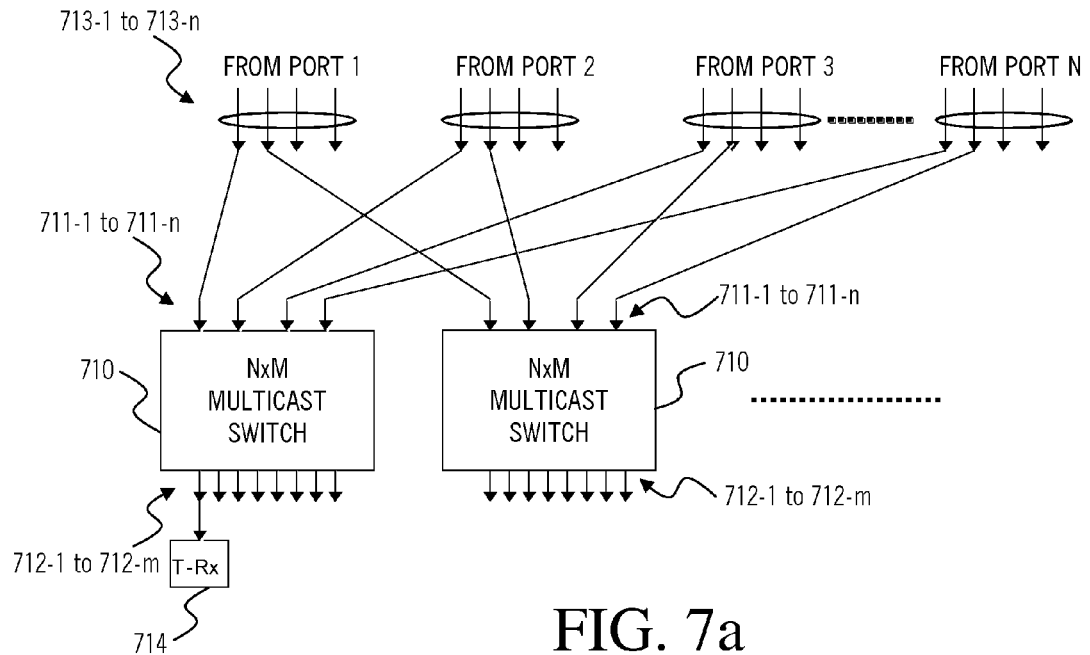
FIGS. 7(a) and 7(b) are schematic diagrams illustrating examples of directionless ROADMs consistent with an aspect of the present invention.
Figure 7B:
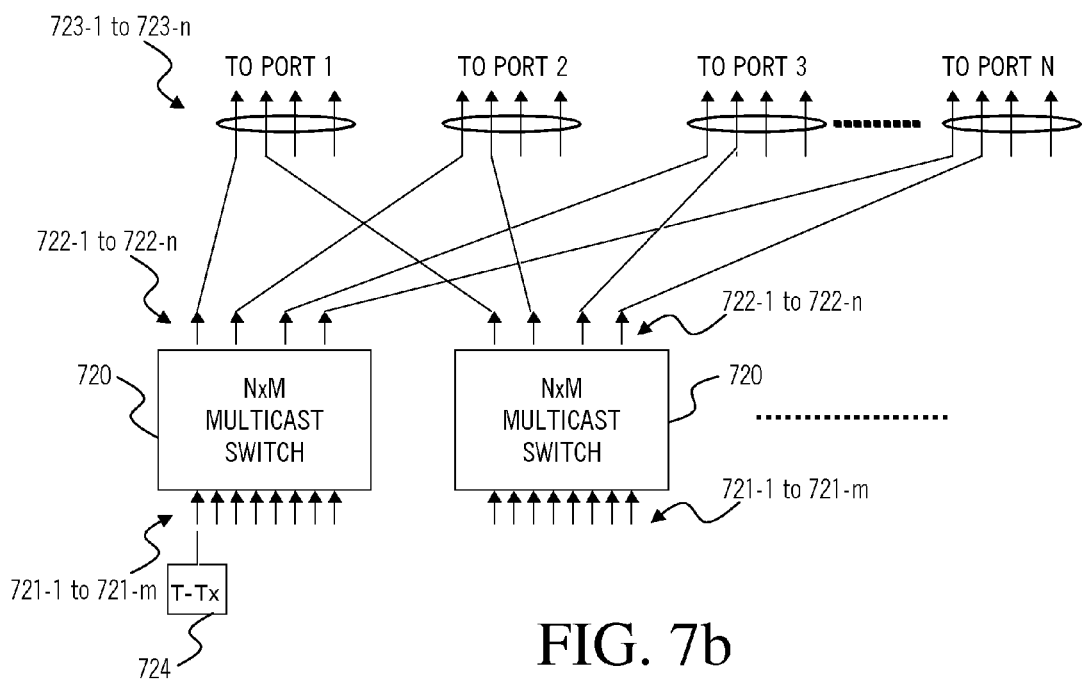

Referring to FIGS. 7(a) and 7(b), the key enabler for this architecture is to have a directionless signal distribution module that is powered by its N×M multi-cast switches 710 and 720 for dynamic optical signal rerouting without wavelength or direction constraints. This signal distribution module has N inputs 711-1 to 711-n from N ports 713-1 to 713-n and M outputs 712-1 to 712-m and a tunable receiver 714 equipped with a tunable filter (not illustrated) that is utilized to select the exact wavelength for drop (see FIG. 7(a)) A similar design is implemented at the add side (see FIG. 7(b)), with a tunable transmitter 724 equipped with a tunable filter (not illustrated) that is utilized to select the exact wavelength for add and M inputs 721-1 to 721-m and N outputs 722-1 to 722-n to N ports 723-1 to 723-n.

Figure 8A:
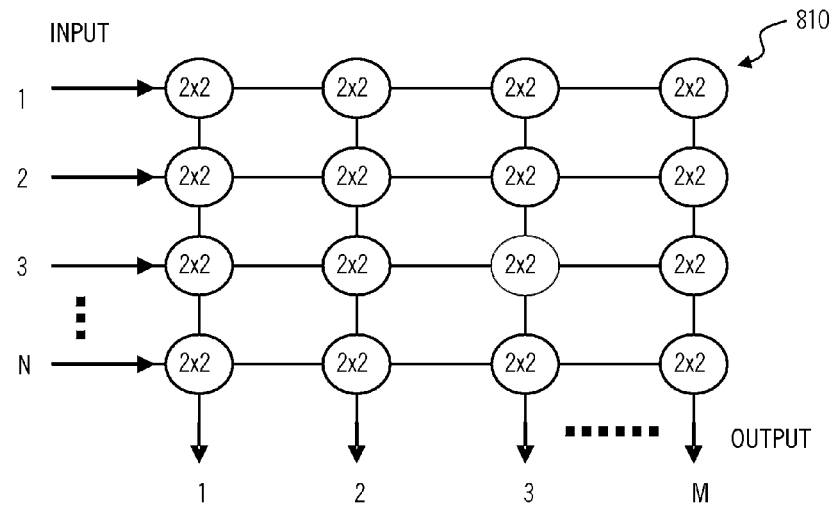
FIGS. 8(a) and 8(b) are schematic diagrams illustrating examples of N×M multi-cast switches consistent with an aspect of the present invention.
Figure 8B:
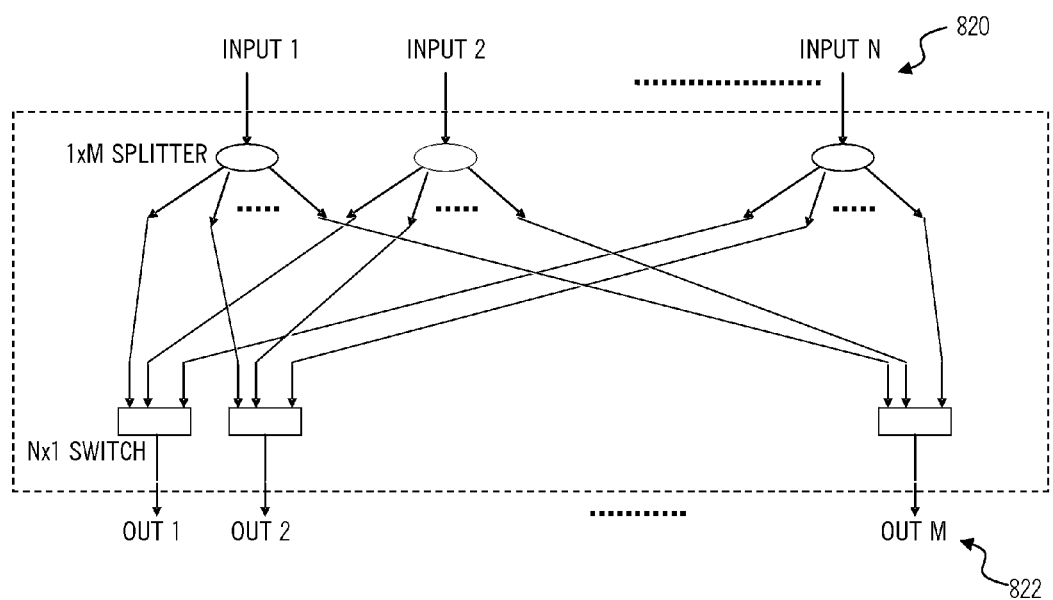

In general, there are two types of N×M multi-cast switches. Type A is realized through PLC technology by cascading 2×2 thermo-optic Mach-Zehnder switches 810 in an N×M configuration (see FIG. 8(a)), which has been disclosed by Infineon and Lynx Photonics in 2000 and 2001, for example. In this configuration, signals experience different insertion losses (ILs) under different splitting conditions, where extra variable optical attenuator (VOA) stages are normally built in at the output side to balance the output optical power per channel (or per wavelength). Other PLC vendors, such as NEL, for example, can build this type of N×M multi-cast switches by modifying their current N×N optical switch matrices. Type B N×M multi-cast switches are achieved by connecting discrete N 1×M splitter arrays 820 and M N×1 switch arrays 822, as illustrated in FIG. 8(b). The M N×1 switch arrays 822 may be based on any technology, including three-dimensional (3D) micro-electromechanical system (MEMS) technology. In most designs, type B N×M multi-cast switches utilize a fixed splitter at the front end, such that all of the optical paths have the same ILs. Advanced technologies may be utilized to manufacture tunable splitters as well, and manufacture type B N×M multi-cast switches having similar functions as type A N×M multi-cast switches, such as type B+ N×M multi-cast switches. Enablence is a vendor of such components, for example.

Figure 9:
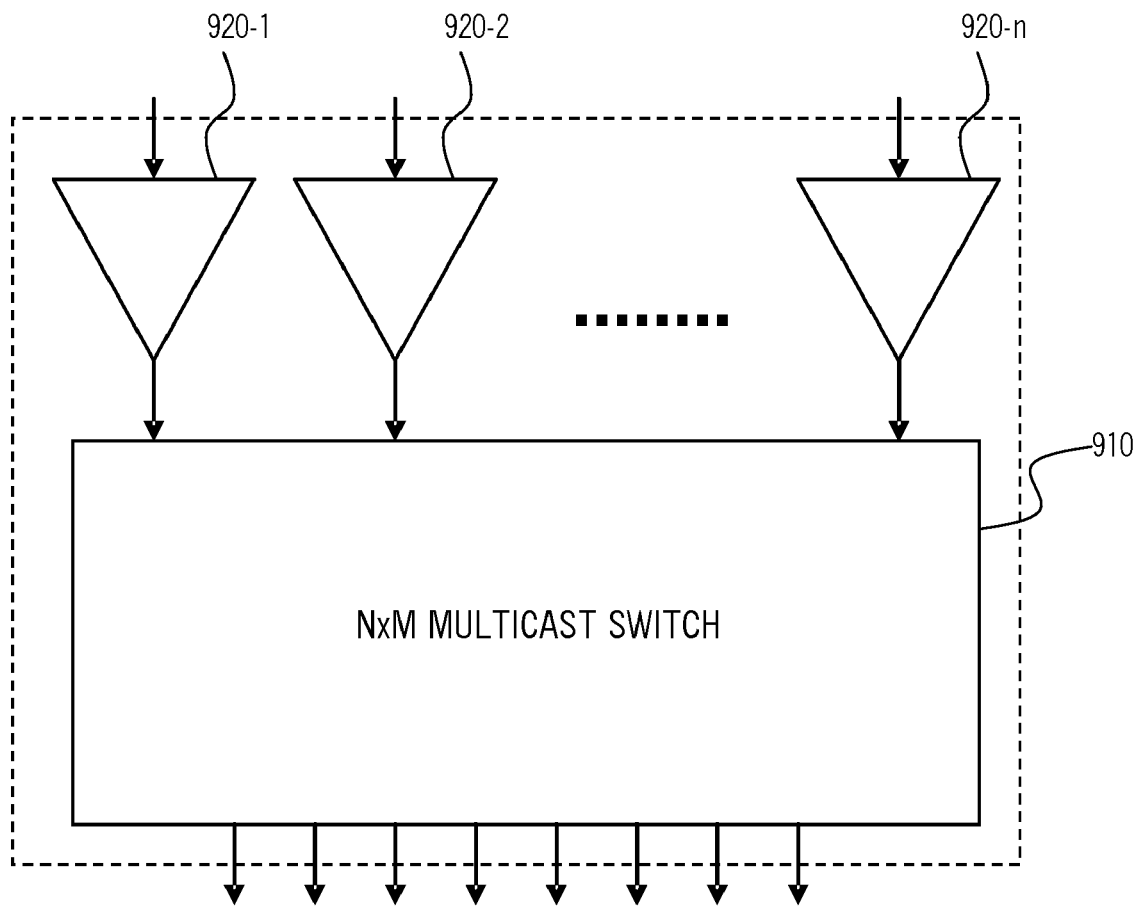
FIG. 9 is a schematic diagram illustrating a signal distribution module employing an N×M multi-cast switch and a conventional EDFA array consistent with an aspect of the present invention.

Referring to FIG. 9, the ILs introduced by optical power splitting through either a fixed power splitting ratio in type B N×M multi-cast switches or a reconfigurable power splitting ratio in type A or type B+ multi-cast switches may be compensated for utilizing EDFAs 920-1, 920-2, and 920-n arranged in an array and coupled to the N×M multi-cast switch 910.

Type B multi-cast switches with fixed power splitting ratios have fixed ILs for all of the associated optical communication paths that are relatively easy to manage with a conventional EDFA array, which is normally running in a constant gain or constant power mode. In order to ensure the per channel optical power output of the N×M multi-cast switch 910 meeting certain power level specifications, each EDFA 920-1, 920-2, and 920-n of the EDFA array should be powerful enough to cover the large ILs of the type B N×M multi-cast switch. It will be readily apparent to those of ordinary skill in the art that type A multi-cast switches may also be used in this design, but the IL for each optical communication path varies from configuration to configuration, unless VOAs are used to balance this power variation.

On the other hand, silica-based PLCs have been implemented in EDFA design for several years because of their superior stability, high reliability, and impressive flexibility. Recently, JDS Uniphase has built a three-stage erbium amplifier prototype using a PLC chip that includes 980 nm/1550 nm WDMs, fixed ratio taps, variable optical attenuators, and a 980 nm pump laser/tunable splitter. The use of a tunable splitter allowed the pump laser to be operated more efficiently and inexpensively. This type of design does not provide significant cost advantages for a single EDFA, but it is feasible to build smaller size and lower cost EDFA arrays (see, e.g. U.S. Pat. No. 6,980,576).

Figure 10:
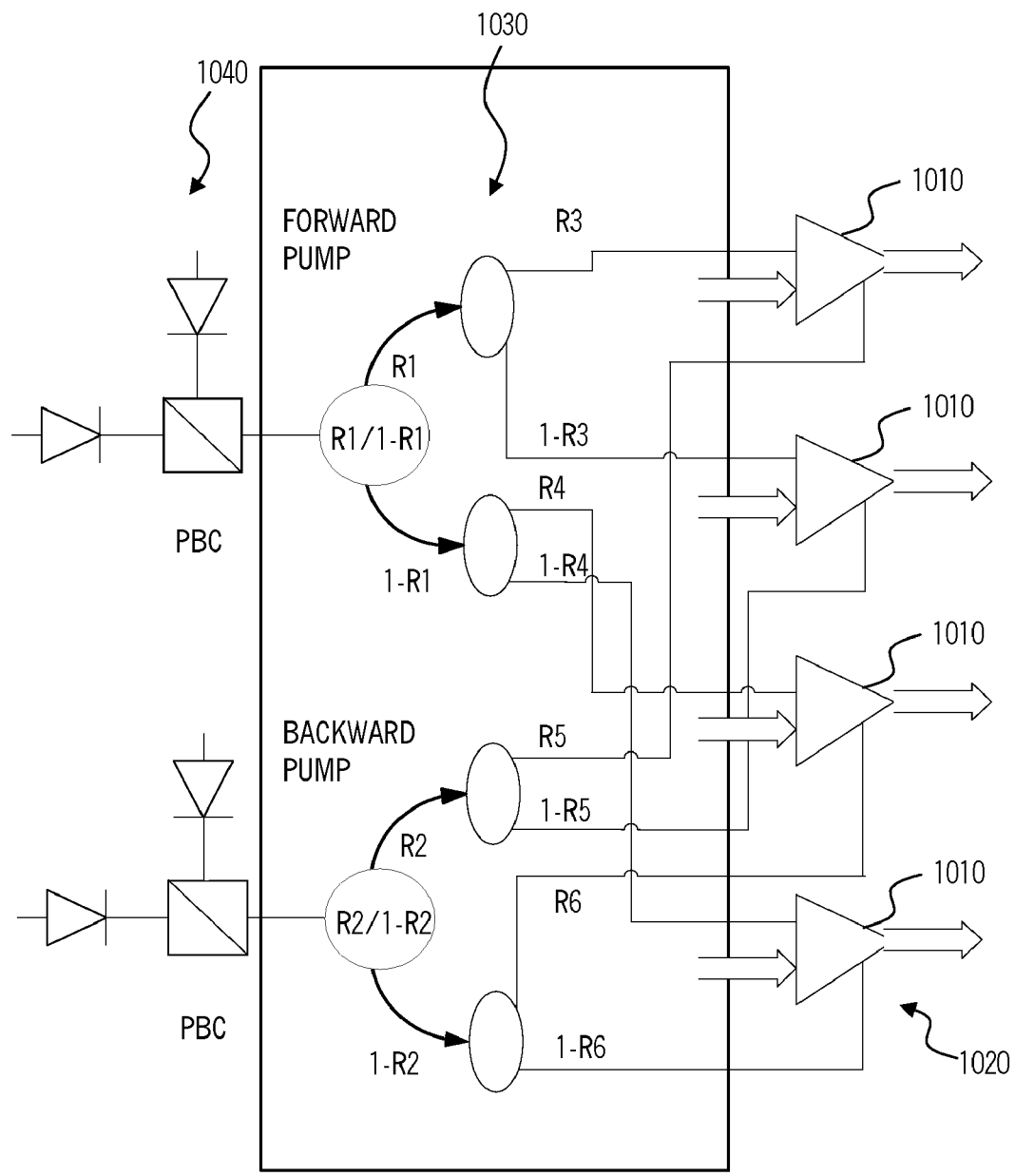
FIG. 10 is a schematic diagram illustrating a 4-EDFA array design utilizing 1×4 tunable splitters.

FIG. 10 is a schematic diagram illustrating a design utilizing four EDFAs 1010 arranged in an array 1020 and using 1×4 tunable splitters 1030. The EDFA array 1020 may share up to four pumps 1040, for example, to maximize the output power.

The 1×4 tunable splitters may be integrated with other components, such as VOAs and 980 nm/1550 nm WDMs, for example. This concept may be extended to an array of eight EDFAs, etc.

Again, in existing ROADM designs, EDFA arrays with fixed gains or output powers are utilized in order to satisfy a worst case scenario, even though there are only M (e.g. 8 or 16) channels to be dropped for a given modular design. This is not a cost effective solution. Each EDFA is over designed to support the worst case scenario, when all of the wavelengths of light or channels are fully populated. More than 40% of the associated cost is attributed to the pump lasers for the individual EDFAs. In order to simplify the design of the signal distribution modules utilized in directionless ROADM applications, as well as shrink their size and lower their cost, the present invention provides a novel configuration that takes full advantage of type A/type B+ N×M multi-cast switches and the advanced EDFA array design with PLC-based tunable pump splitters.

Figure 11:
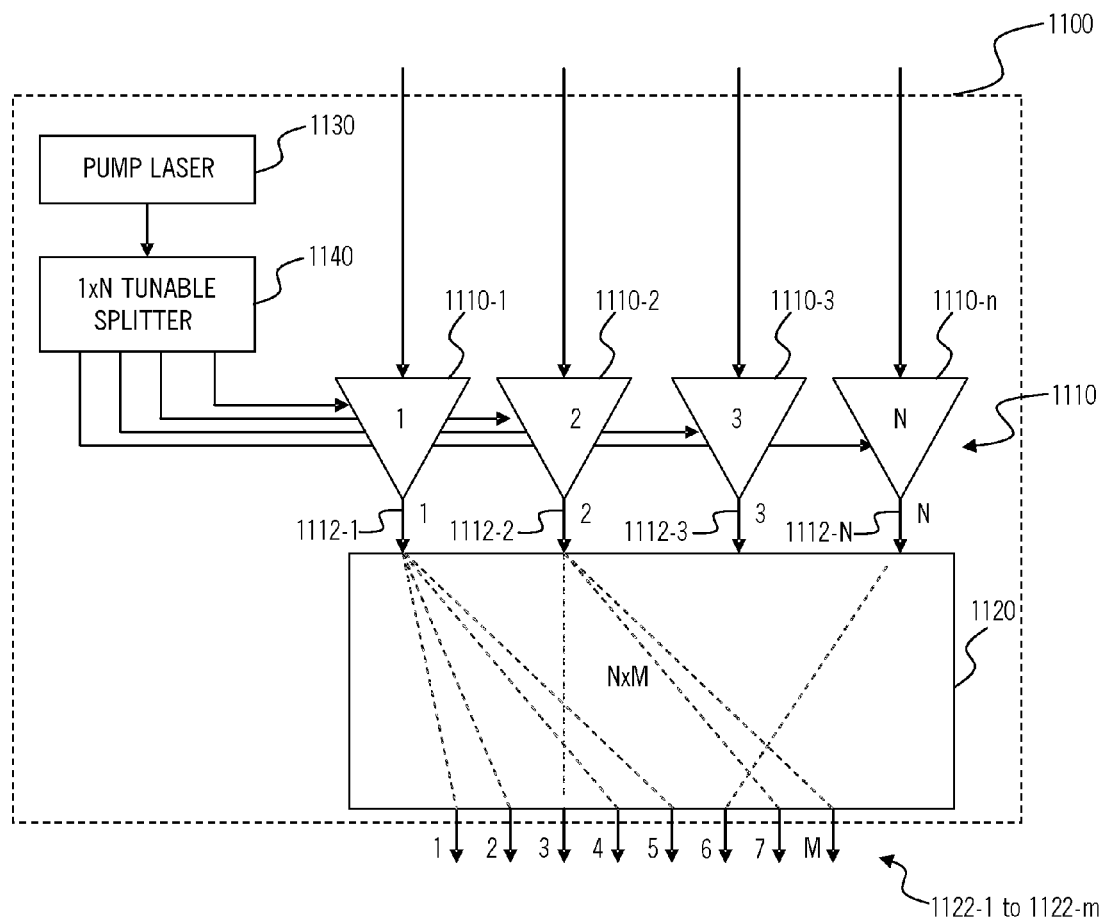
FIG. 11 is a schematic diagram illustrating a signal distribution module incorporating an EDFA array coupled to a shared pump laser and tunable splitter in order to accommodate the variable insertion losses of an N×M multi-cast switch.

Referring to FIG. 11, signal distribution module 1100 of the present invention includes an EDFA array 1110 incorporating N EDFAs 1110-1, 1110-2, 1110-3, and 1110-n coupled to N inputs 1112-1, 1112-2, 1112-3, and 1112-n of an N×M multi-cast switch 1120 including M outputs 1122-1 to 1122-m, as well as to a shared pump laser 1130 and a 1×N tunable splitter, in order to accommodate the variable ILs of the N×M multi-cast switch 1120. For example, as illustrated in FIG. 11, a 4×8 multi-cast switch 1120 is configured as a 1×4 splitter for input port 1 1112-1 (with 6 dB theoretical splitting loss) and a 1×3 splitter for input port 2 1112-2 (with 5 dB theoretical splitting loss), with no connection for input port 3 1112-3 and a one-to-one connection for input port 4 1112-n (with 0 dB theoretical splitting loss). In this configuration, different amounts of the pump laser signal may be delivered to each EDFA 1110-1, 1110-2, 1110-3, and 1110-n—50% to EDFA 1 1110-1, 40% to EDFA 2 1110-2, none to EDFA 3 1110-3, and 10% to EDFA 4 1110-n. Thus, the following may be achieved: 6 dBm total output power from EDFA 1 1110-1, 5 dBm total output power from EDFA 2 1110-2, no light from EDFA 3 1110-3, and 0 dBm total output power from EDFA 4 1110-n. After the 4×8 multi-cast switch 1130, an equal power of −3 dBm is observed at all the output ports 1122-1 to 1122-m (assuming a 3 dB intrinsic IL for each of the switches).

The signal distribution module of the present invention represents an ideal solution for directionless ROADM applications as it represents a low cost, compact, low power consumption assembly. For example, up to an 8-channel drop may be realized on a single one-slot card.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A signal distribution module for use in a directionless reconfigurable optical add/drop multiplexer application, comprising:
   a multi-cast switch having a plurality of input ports and a plurality of output ports;
   a plurality of optical amplifiers coupled to the plurality of input ports of the multi-cast switch, wherein the plurality of optical amplifiers form an optical amplifier array;
   a tunable optical splitter coupled to the plurality of optical amplifiers; and
   a pump laser coupled to the tunable optical splitter.

2. The signal distribution module of claim 1, wherein the multi-cast switch comprises an N X M multi-cast switch having N input ports and M output ports.

3. The signal distribution module of claim 2, wherein the plurality of optical amplifiers comprise N optical amplifiers coupled to the N input ports of the N X M multi-cast switch.

4. The signal distribution module of claim 3, wherein the tunable optical splitter comprises a 1 X N tunable optical splitter coupled to the N optical amplifiers.

5. The signal distribution module of claim 1, wherein the plurality of optical amplifiers comprise a plurality of erbium-doped fiber amplifiers, and wherein the plurality of erbium-doped fiber amplifiers form an erbium-doped fiber amplifier array.

6. The signal distribution module of claim 1, wherein the tunable optical splitter is operable for providing a predetermined portion of a pump laser signal emanating from the pump laser to each of the plurality of optical amplifiers.

7. The signal distribution module of claim 6, wherein the tunable optical splitter is operable for providing the predetermined portion of the pump laser signal emanating from the pump laser to each of the plurality of optical amplifiers responsive to an insertion loss associated with each of a plurality of corresponding switches of the multi-cast switch.

8. The signal distribution module of claim 7, wherein the tunable optical splitter is operable for providing the predetermined portion of the pump laser signal emanating from the pump laser to each of the plurality of optical amplifiers responsive to the insertion loss associated with each of the plurality of corresponding switches of the multi-cast switch, wherein the insertion loss associated with each of the plurality of corresponding switches of the multi-cast switch is a result of how many splits each of the plurality of corresponding switches of the multi-cast switch provides.

9. The signal distribution module of claim 7, wherein the tunable optical splitter is operable for providing the predetermined portion of the pump laser signal emanating from the pump laser to each of the plurality of optical amplifiers responsive to the insertion loss associated with each of the plurality of corresponding switches of the multi-cast switch such that a total output power of each of the plurality of output ports of the multi-cast switch is substantially equal.

10. A signal distribution method for use in a directionless reconfigurable optical add/drop multiplexer application, comprising:
   providing a multi-cast switch having a plurality of input ports and a plurality of output ports;
   coupling a plurality of optical amplifiers to the plurality of input ports of the multi-cast switch, wherein the plurality of optical amplifiers form an optical amplifier array;
   coupling a tunable optical splitter to the plurality of optical amplifiers; and
   coupling a pump laser to the tunable optical splitter.

11. The signal distribution method of claim 10, wherein the multi-cast switch comprises an N X M multi-cast switch having N input ports and M output ports.

12. The signal distribution method of claim 10, wherein the plurality of optical amplifiers comprise a plurality of erbium-doped fiber amplifiers, and wherein the plurality of erbium-doped fiber amplifiers form an erbium-doped fiber amplifier array.

13. The signal distribution method of claim 11, wherein the plurality of optical amplifiers comprise N optical amplifiers coupled to the N input ports of the N X M multi-cast switch.

14. The signal distribution method of claim 13, wherein the tunable optical splitter comprises a 1 X N tunable optical splitter coupled to the N optical amplifiers.

15. The signal distribution method of claim 10, wherein the tunable optical splitter is operable for providing a predetermined portion of a pump laser signal emanating from the pump laser to each of the plurality of optical amplifiers.

16. The signal distribution method of claim 15, wherein the tunable optical splitter is operable for providing the predetermined portion of the pump laser signal emanating from the pump laser to each of the plurality of optical amplifiers responsive to an insertion loss associated with each of a plurality of corresponding switches of the multi-cast switch.

17. The signal distribution method of claim 16, wherein the tunable optical splitter is operable for providing the predetermined portion of the pump laser signal emanating from the pump laser to each of the plurality of optical amplifiers responsive to the insertion loss associated with each of the plurality of corresponding switches of the multi-cast switch, wherein the insertion loss associated with each of the plurality of corresponding switches of the multi-cast switch is a result of how many splits each of the plurality of corresponding switches of the multi-cast switch provides.

18. The signal distribution module of claim 16, wherein the tunable optical splitter is operable for providing the predetermined portion of the pump laser signal emanating from the pump laser to each of the plurality of optical amplifiers responsive to the insertion loss associated with each of the plurality of corresponding switches of the multi-cast switch such that a total output power of each of the plurality of output ports of the multi-cast switch is substantially equal.

19. A signal distribution module for use in a directionless reconfigurable optical add/drop multiplexer application, comprising:
a multi-cast switch having a plurality of input ports and a plurality of output ports;
a plurality of optical amplifiers coupled to the plurality of input ports of the multi-cast switch, wherein the plurality of optical amplifiers form an optical amplifier array;
a tunable optical splitter coupled to the plurality of optical amplifiers; and
a pump laser coupled to the tunable optical splitter;
wherein the tunable optical splitter is operable for providing a predetermined portion of a pump laser signal emanating from the pump laser to each of the plurality of optical amplifiers such that a total output power of each of the plurality of output ports of the multi-cast switch is substantially equal.

* * * * *